March 20, 1962 C. M. RICE ET AL 3,026,055
CLUTCH FOR THREAD COLLECTING MACHINES
Filed Feb. 21, 1958
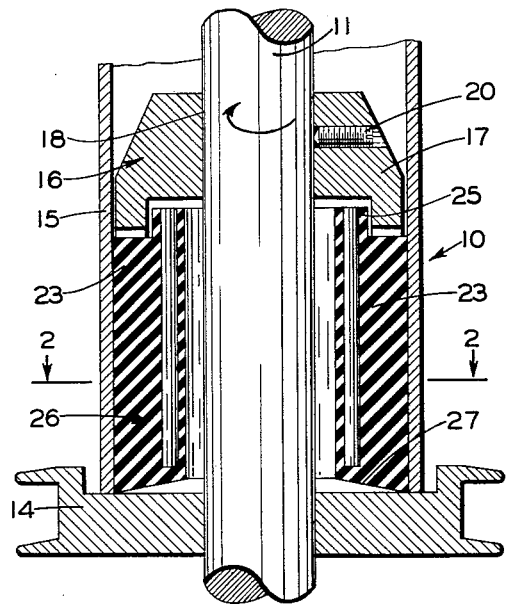
Fig. 1.
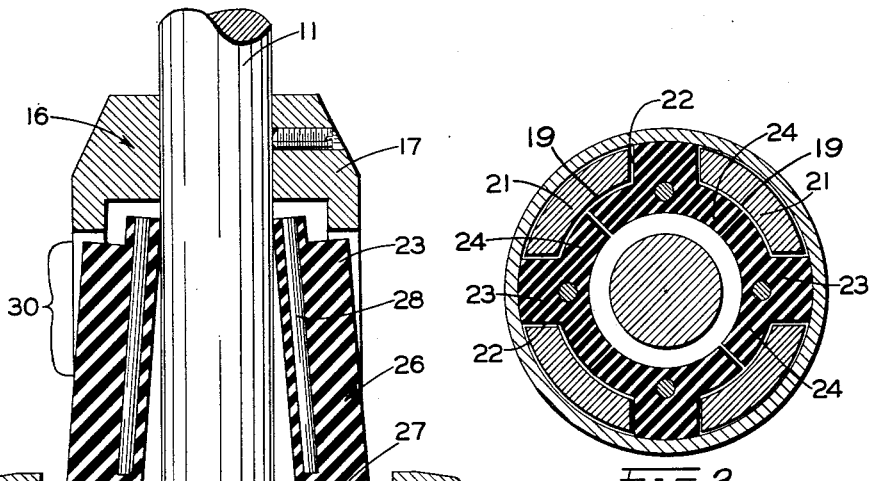
Fig. 3.
Fig. 2.
INVENTORS
CHARLES M. RICE
MILTON A. SULLIVAN
BY Francis W. Young
ATTORNEY

United States Patent Office 3,026,055
Patented Mar. 20, 1962

3,026,055
CLUTCH FOR THREAD COLLECTING MACHINES
Charles M. Rice, Candler, and Milton A. Sullivan, Enka, N.C., assignors to American Enka Corporation, Enka, N.C., a corporation of Delaware
Filed Feb. 21, 1958, Ser. No. 717,294
1 Claim. (Cl. 242—46.5)

The present invention relates in general to centrifugally operated clutches and more particularly to the retraction of clutch elements used for coupling a hollow thread-receiving pirn, tube or bobbin to a vertical drive spindle.

Centrifugally operated spindle clutches are well known to the textile field and various types are in general use commercially. This invention relates to that type of clutch shown in British Patent No. 6,500, dated March 17, 1913, wherein a plurality of clutch elements are positioned around the vertical drive spindles of thread twisting or other thread collecting machines. These clutch elements are mounted for rotational movement with the drive spindle and for radial movement with respect to said spindle. Upon rotation of the spindle during the collection of thread, the effect of centrifugal force is to urge the clutch elements outwardly away from the spindle and into engagement with the inner surface of the thread receiving tube, thereby enabling the latter to be driven from the former.

A cage or housing, non-rotatably secured to the spindle, encloses the clutch elements and imparts rotation thereto about the axis of the spindle. The cage is provided with a plurality of longitudinal slots, one for each clutch element, through which said elements project during operation. Each clutch element is provided with a pair of longitudinal flanges which cooperate with the inner surface of the cage adjacent each slot in order to prevent complete separation of the cage and elements in the event that the spindle is rotated while empty, or while no thread-receiving tube is positioned thereon.

It has been found, however, that a difficulty arises if the type of clutch described above is rotated when empty or without a yarn collecting tube or package thereover. During such operation, the clutch elements will project outwardly until restrained by engagement of the respective flanges with the inner surface of the cage. When rotation of the spindle is discontinued for adding a tube thereto, the clutch elements remain in this projecting position, and the effective diameter of the clutching surfaces is greater than the internal diameter of the tube (which condition is necessary if clutching is to occur with the tube placed in position). The projecting position of the clutch elements thereby obstructs subsequent mounting of a tube over the spindle after rotation of the spindle in an empty condition.

Since the spindles of the type of machine to which this invention relates are continually urged to rotate by means of a belt drive, rotation of a single spindle cannot be prevented unless the operator manually actuates the brake lever provided for this purpose on each spindle. This being impractical because of the large number of spindles on a conventional machine, the spindles are permitted to rotate even though, frequently, they must operate in the aforesaid empty condition, or without tubes placed thereover. This operation leads to difficulty in positioning tubes, as explained hereinabove, and both hands of the operator are required for doffing a single spindle, which precludes any possibility of one operator doffing two spindles at one time.

Various expedients have been proposed for alleviating this difficulty. For example, the upper edge of each clutch element may be beveled inwardly or necked down in order to obtain a wedge effect, whereby downward movement of a tube over the projected clutch elements should result in a radially inward movement of each element. This system is not completely satisfactory in practice, however, probably because of the high coefficient of friction which must exist between the elements and the tube if a positive clutching effect is to be obtained during operation. Necking down or beveling of the upper surface on the clutch element of course reduces the surface contact area and, accordingly, lowers the over-all clutch efficiency.

It has also been proposed that resilient means, such as a rubber band or coil spring, be provided to facilitate withdrawal of the clutch elements from projecting position when rotation of the spindle is stopped. This resilient means usually encircles the upper edge of all of the clutch elements and urges the same radially inwardly toward the spindle. While this system is theoretically sound, it also suffers from disadvantages under actual operating conditions. It is evident that the resilient means opposes the effect of centrifugal force on the clutch elements during rotation of the spindle, which of course results in a decreased clutch efficiency. Although the reduction in efficiency can be minimized by proper selection of the resilient means, it is obvious that a spring, for example, sufficiently weak to have little or no effect on the clutching action will not be strong enough to perform the clutch element withdrawing function. It can be seen, therefore, that this system is at best no more than a compromise between that which is desired and that which can be obtained.

Furthermore, a resilient means such as described above entails constant maintenance since the springs or rubber bands, through continued use, become too weak to perform the withdrawal function and must be replaced if doffing is to be expedited to the desired degree. The disadvantages outweigh the advantages to such an extent that this expedient is not used extensively in practice.

While the discussion up to this point has been concerned with a tube positioning problem arising after a spindle has been rotated while empty, a similar situation exists in doffing even if the spindles have not been rotated without tubes. As mentioned above, it has been suggested that the upper outer edge of each clutch element be beveled. There of course is a limit to the extent which these elements may be beveled since the removal of material from the outer surface will reduce the clutching effect proportionately. Thus, even with beveled edges a positioning problem arises. When a tube becomes filled with thread (at the end of the collection period), the same is removed from the spindle by a vertically upward sliding movement. This leaves the clutch elements in substantially their normal operating position or with the outer diameter of the clutch substantially equal to the inner diameter of the tube removed therefrom. Unless the next empty tube placed thereover is centered exactly with respect to these clutch elements, the leading end of this tube will strike one of the clutch elements and move the same out into the projecting position discussed above, thereby obstructing tube positioning until the operator slides the displaced element radially within the clutch housing, this generally requiring the use of both hands. Such an operation of course also prevents simultaneous doffing of two spindles by one operator, which procedure would permit reduction in the overall time required for doffing a thread or yarn collecting machine.

The magnitude of the problems discussed above can best be illustrated by reference to an actual thread collecting apparatus. In a conventional drawtwisting machine, for example, thread usually is drawn and collected on a hollow tube driven by a spindle such as shown in the attached drawings. There usually are 80 or more such spindles on each machine and each of these collects drawn thread at a linear speed of about 1250 feet per minute, or higher. One operator usually is in charge of one machine, and frequently the same operator is in charge of two machines. This operator is required to make all of the tube changes, or doffs, and must also maintain a constant check on the entire machine in order to insure proper drawing and collection of thread at all of the spindle positions in operation. It can be seen that a slight saving in time at each spindle, or during each doffing operation, can amount to a considerable saving over a period of days or weeks in view of the large number of spindles assigned to each machine operator.

An object of this invention, therefore, is to provide a spindle clutch not having the disadvantages of known clutches.

Another object of this invention is to provide a centrifugally operated spindle clutch by the use of which doffing may be expedited.

A still further object of this invention is to provide a centrifugally operated spindle clutch so arranged that tube doffing may be accomplished by one hand of the thread collecting machine operator.

An additional object of this invention is to provide a centrifugally operated spindle clutch whose elements will, at least at their upper ends, retract inwardly of the clutch housing upon discontinuation of spindle rotation, such retraction occurring without the use of resilient bands, springs or other additional means for performing this function.

Still another object of the present invention is to provide a centrifugally operated spindle clutch having individual clutch elements so constructed that an effective beveled surface is presented during doffing without reducing the surface area of the clutching elements during operation.

Another object of this invention is to provide a centrifugally operated spindle clutch which requires no maintenance after installation and which will operate for a substantially indefinite period without replacement.

A further object of this invention is to provide a centrifugally operated spindle clutch of simplified design utilizing known effects of gravitational forces to enable retraction of the individual clutch elements, at least at the upper ends thereof, within a clutch housing upon discontinuation of spindle rotation, which is of simplified design, low initial cost and which employs a minimum of moving parts for this type clutch.

Other objects and advantages of this invention will become apparent to those skilled in this art upon study of the following detailed disclosure.

These objects may be accomplished in accordance with the present invention by securing a cage or clutch housing to a rotatable spindle as set forth above, by supporting each clutch element outwardly from the center of gravity during operation and by permitting unopposed radially inward movement of each element, each element being statically unbalanced because of the displaced center of gravity and support, whereby upon discontinuation of spindle rotation each element will tilt from the supported end toward the spindle and radially inwardly of the clutch housing at least at the upper or unsupported end thereof. It is preferred that the center of gravity of each element be displaced by providing a raised outer edge on the lower end thereof, which may be accomplished by beveling the lower surface of each element, the bevel beginning at the outer edge and extending upwardly and inwardly toward the spindle.

A specific embodiment of the present invention will now be discussed in conjunction with the accompanying drawings, wherein FIGURE 1 is an elevational view, partly in section, of a collecting spindle, including a collecting tube, adapted for use with the novel clutch described herein, and illustrating the operative position of the latter;

FIGURE 2 is a sectional view taken along the lines 2—2 of FIGURE 1; and

FIGURE 3 is an elevational view similar to FIGURE 1 but showing the clutch elements in a condition of repose, illustrating the inoperative position of the same, with the collecting tube removed.

With attention now directed to FIGURE 1, reference numeral 10 generally indicates a single thread collecting station. It will be apparent that a plurality of these stations will be provided on each collecting machine. As indicated earlier, 80 or more spindles are provided on a conventional drawtwisting machine to which this invention is particularly adapted for use, and a similar number of spindles would be provided on spinning or winding machines. Inasmuch as the spindles on each machine are substantially identical in structure, further discussion will be limited to the single station shown.

Thread collecting spindle 11 is rotatably mounted on the front side of a collecting machine by means not shown. Drive pulley 12 is fixed onto the lower end of spindle 11 and the spindle is usually rotated through this pulley by the use of a drive belt such as shown at 13 and any suitable drive motor (not shown). Immediately above the drive pulley, and also adjacent to the lower end of the spindle, a tube support 14 is provided, this support being fixed to the spindle. The conventional tube support is provided with a flat upper surface which extends in a plane normal to the spindle axis, as shown. Support 14 serves not only as a means for holding thread collecting tube 15 but also positions this tube longitudinally with respect to a ring traveler, in the case of drawtwisting, or a flyer or thread guide (also not shown) in the case of spinning or winding.

Clutch cage or housing 16 is non-rotatably secured to spindle 11 above the tube support, or on that side of the support opposite drive pulley 12, as shown. The hub portion 17 of the housing has a generically cylindrical external surface corresponding in dimension to the internal diameter of a tube to be used on this particular spindle and is provided with a suitable bore 18 which receives spindle 11. A set screw 20 may be used for securing the hub portion to the spindle.

Formed integrally with and extending downwardly from the hub portion 17 are legs 21 (see FIGURE 2). In the embodiment shown, four such legs are provided although it will become obvious hereinafter that a different number could be utilized. These legs are symmetrically disposed circumferentially around spindle 11 and consequently have curved inner and outer surfaces when viewed in cross section, as illustrated by FIGURE 2. Each leg is separated from the legs adjacent thereto, a neighboring pair of legs defining therebetween a longiutdinal slot 22. Four of these slots of course are formed by the four legs shown herein. Each of legs 21 extends from hub portion 17 substantially to tube support 14 and, in fact, may rest upon this support if desired. The slots 22, therefore, are elongated and extend longitudinally of spindle 11.

Within each slot 22 there is positioned one of the novel clutch elements 23 to which this invention pertains. These clutch elements are elongated in order to fit within the slots provided therefor and have flanges 24 extending laterally from the body portion thereof. If spindle 11 is rotated without a tube 15 positioned thereover, these flanges engage the inner curved surface 19 of legs 21 and prevent separation of the clutch elements from the housing and spindle. An additional flange 25 may be provided at the upper end of each clutch element 23 if added retention if desired, but this usually is not necessary.

The lower or supported end 26 of each clutch element 23 is provided with a beveled surface 27 which may be formed by cutting, grinding or in any other suitable manner, such as by suitable shaping of the original mold. The beveled surface 27 shown herein was formed by cutting away the inner portion of the lower edge of each element, although it is obvious that the same effect could be obtained by adding material at the outer edge thereof. The important limitation is that each clutch element be supported at a point radially outward of the center of gravity, in order to render the same statically unbalanced in a vertical inoperative position, and that the inner edge of the lower end 26 be spaced vertically from the planar surface of tube support 14 in order to allow tilting movement of the element inwardly at the upper end upon discontinuation of spindle rotation.

It is desired that the clutch elements 23 be formed from any material or combination of materials having a sufficiently high coefficient of friction to transmit rotation from the spindle to the thread receiving tube such as, for example, rubber, plastic, asbestos or metal with or without faces formed from clutching material. It is also desired that the material selected have sufficient mass to enable positive clutching action between the outer face of each element and the inner surface of a tube even at low spindle speeds, as when starting a thread collection cycle after a doffing operation. When using the apparatus of this invention on spindles driving extremely large or heavy tubes or pirns, it may be desirable to add weight to each clutch element in order to increase the clutching effect due to centrifugal force. This may be accomplished by inserting or imbedding metallic auxiliary rods 28 longitudinally within each clutch element, as shown in FIGURE 3. The rod length required may of course be determined by experiment. If these rods are inserted inwardly of the clutch element with respect to the center of gravity thereof, they will expedite not only the clutching effect, but also the automatic and spontaneous retraction of each element upon discontinuation of spindle rotation.

One cycle of operation will now be explained with particular reference first to FIGURE 3 and then to FIGURE 1. In the FIGURE 3 position, the drive means for spindle 11 is disconnected and the entire collecting station is held in a non-rotative condition by the operator. Inasmuch as no centrifugal force is applied to the clutch elements 23, the same are shown in their natural condition of repose, the effective center of gravity (not indicated) being such as to cause these elements to tilt inwardly toward and rest against the spindle 11. If the angle of the beveled surface is less than that shown in the drawings, it will be obvious that the elements will rest on beveled surface 27, thus producing the same attitude of repose.

It can be seen from FIGURE 3 that the angle of inclination of each element 23 from the vertical is small, resulting in a favorable mechanical advantage. In other words, the vertically downward force required to produce radially inward movement of supported ends 26 will be substantially smaller than would be the case if the clutching surface of each element were lying at an angle of, for example, 45° with respect to the vertical. As a matter of fact, a very slight vertically downward force applied to a tube being positioned over the spindle and clutch will produce radially inward movement in these elements. Tube positioning, therefore, can easily be accomplished with one hand of the machine operator, thus enabling simultaneous positioning of two tubes by the same person.

Reference numeral 30 represents that portion of each clutch element which is retracted substantially completely within the clutch housing 16. In order to obtain the same effect discussed above with a beveled upper edge of each element, it can be seen that the bevel would have to extend at least the distance of this portion 30. Since the retracted portion 30 represents approximately one half of the length of each clutch element, it also can be seen that the clutching efficiency of an element having such an equivalent beveled upper edge would be reduced accordingly, since the material removed upon beveling of this edge is lost and therefore cannot contribute to the clutching action.

With the collecting station manually braked to an inoperative condition, the operator places an empty tube 15 over the spindle and clutch and proceeds with threading-up of this station. After the leading end of the thread supply is suitably attached to the empty tube, the spindle brake is released and spindle rotation commences. Immediately upon rotation of the spindle 11, the effect of centrifugal force is to urge each clutch element outwardly into engagement with tube 15, as shown in FIGURE 1, which results in a substantially positive coupling of the tube to the spindle for rotation therewith, as is known to those skilled in this art.

The FIGURE 1 position of the clutch elements is maintained until the end of thread collection on that particular tube 15, or so long as the spindle 11 continues to rotate. Immediately upon discontinuation of spindle rotation, however, the centrifugal force is no longer applied and the clutch elements, which are unstable in the FIGURE 2 position because of the displaced center of gravity, seek a condition of repose such as shown in FIGURE 3. This condition is such that the clutch elements are retracted, at least at the upper ends thereof, from the inner surface of the tube. This not only serves the same function as the beveled upper edges discussed hereinabove, and in a more satisfactory manner because of the small angle of inclination and increased retracted portion 30, but also utilizes as a clutching surface the entire exposed area of each clutch element. Moreover, it is virtually impossible for the elements 23 to be accidentally jarred or otherwise moved outwardly to a position such that the upper end thereof obstructs the positioning of a tube, since this upper end of each element will project outwardly of the clutch housing only upon the application of a force sufficient to unbalance the same and to overcome the position of repose shown in FIGURE 3. It should be apparent from the foregoing that tube positioning, and consequently tube doffing, on a thread collecting machine is greatly expedited by the use of the present invention.

As mentioned hereinabove, it is not essential that auxiliary rods 28 be utilized, although it may be desirable when collecting threads on extremely large or heavy tubes. Additionally, it is not necessary that the specific number of clutch elements shown in the drawings be provided. Any number of course could be used so long as they are disposed symmetrically around the spindle in order to maintain rotational balance. Moreover, the use of beveled upper edges on each clutch element, in addition to the beveled surface 27, is possible notwithstanding the disadvantages pointed out hereinabove. Further, as pointed out earlier, it is possible to obtain the same effect described herein by raising the lower outer edge of a clutch element rather than by cutting away or removing the lower inner edge. This could be accomplished, for example, by the addition of pins at the lower outer edge (outwardly of the center of gravity) in order to produce an unstable condition when the clutch elements are in the operative position shown in FIGURES 1 and 2.

Inasmuch as other alternatives and modifications will become apparent to those skilled in this art, it is intended that the present invention be limited not by the detailed disclosure presented herewith but only to the extent set forth in the following claim.

What is claimed is:

In a thread collecting machine having a rotatable vertical spindle, a tube support secured to said spindle near the lower end thereof, said tube support having a planar surface extending normal to the spindle axis, a hub secured to said spindle in coaxially spaced relationship above said tube support, a plurality of legs secured to said hub and extending downwardly therefrom toward said tube support, said legs being spaced circumferentially one from the other about said spindle to define a plurality of elongated slots extending parallel to the spindle axis and being radially spaced from said spindle whereby the hub, legs and spindle define an unobstructed annular zone about said spindle, a plurality of elongated clutch elements positioned within said annular zone with one element projecting into each of said elongated slots, said clutch elements having flanges engageable with at least one inner surface of cooperating legs to prevent loss of said elements upon rotation of said spindle in an empty condition, and means for rotating said spindle and for developing sufficient centrifugal force to urge said clutch elements radially outward through respective slots, the improvement comprising a bevelled surface on the lower end of each clutch element, said beveled surface extending upwardly and inwardly toward the spindle from the outer edge of each element and said edge engaging with said planar surface for supporting said element not only while said spindle is rotating but also upon discontinuation of spindle rotation, said beveled surface permitting radially inward and unopposed retraction of the upper end of each clutch element into said annular zone due to a displaced center of gravity thereof upon removal of centrifugal force developed during spindle rotation, and weight means added to said clutch elements radially inward of the supports therefor not only to facilitate immediate clutching action thereof during rotation of said spindle, but also to expedite quick retraction of said upper clutch element ends upon discontinuation of spindle rotation.

References Cited in the file of this patent

UNITED STATES PATENTS

| | | |
|---|---|---|
| 741,638 | Edwards | Oct. 20, 1903 |
| 773,798 | Lawrence | Nov. 1, 1904 |
| 834,893 | Draper | Nov. 6, 1906 |
| 1,373,085 | Leitch | Mar. 29, 1921 |
| 1,859,963 | Futscher | May 24, 1932 |
| 1,909,976 | Magrath | May 23, 1933 |
| 2,231,122 | Houck | Feb. 11, 1941 |
| 2,755,027 | Jones et al. | July 17, 1956 |

FOREIGN PATENTS

| | | |
|---|---|---|
| 6,500 | Great Britain | Oct. 23, 1913 |